United States Patent [19]
Wood et al.

[11] 3,736,798
[45] June 5, 1973

[54] PERMANENT MAGNET PROBE FLOWMETER

[75] Inventors: Myrick R. Wood, Richland; Bernard H. Duane, Pasco; Delbert L. Lessor, Richland, all of Wash.

[73] Assignee: The United States of America as represented by the United States Atomic Energy Commission, Washington, D.C.

[22] Filed: June 24, 1971

[21] Appl. No.: 174,384

[52] U.S. Cl. ............................................. 73/194 EM
[51] Int. Cl. ........................... G01f 1/00, G01p 5/08
[58] Field of Search .................................. 73/194 EM; 128/2.05 F

[56] References Cited

UNITED STATES PATENTS

| 3,114,260 | 12/1963 | Soller et al. | 73/194 EM X |
| 3,487,826 | 1/1970 | Barefoot | 73/194 EM UX |
| 3,516,399 | 6/1970 | Barefoot | 128/2.05 F |
| 1,249,530 | 12/1917 | Smith et al. | 73/194 EM UX |
| 2,149,847 | 3/1939 | Kolin | 73/194 EM |

FOREIGN PATENTS OR APPLICATIONS

| 1,248,606 | 3/1971 | U.S.S.R. | 73/194 EM |

Primary Examiner—Charles A. Ruehl
Attorney—Roland A. Anderson

[57] ABSTRACT

A probe-type flowmeter for measuring the flow of conducting fluids, in particular liquid sodium, is described. The probe includes a permanent magnet for developing a magnetic flux and a pair of conductors coupled to a metering device for measuring the e.m.f. developed in the conducting fluid. The magnitude of the e.m.f. is a function of the fluid velocity.

8 Claims, 7 Drawing Figures

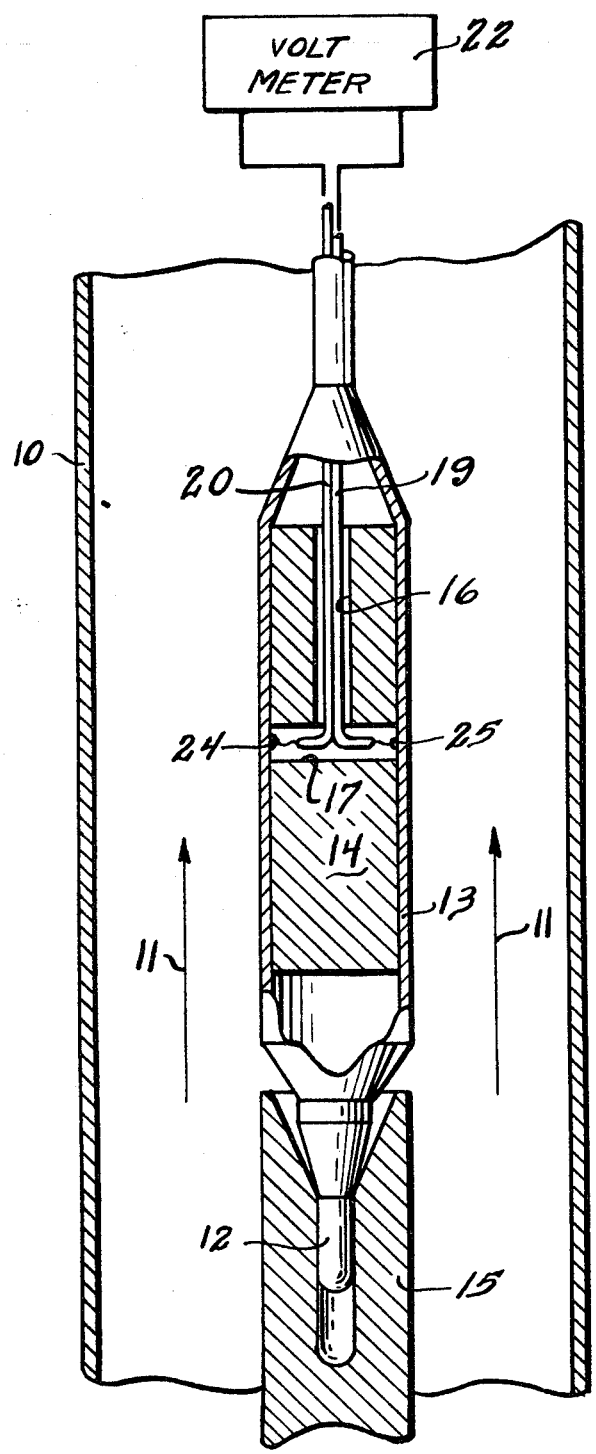
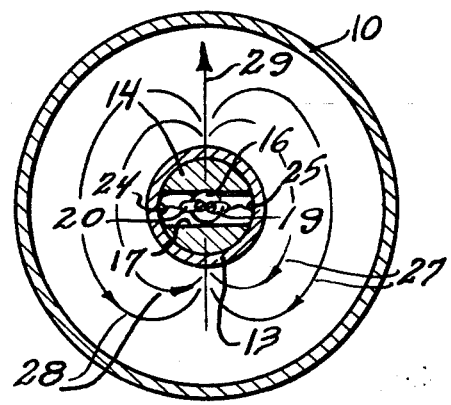
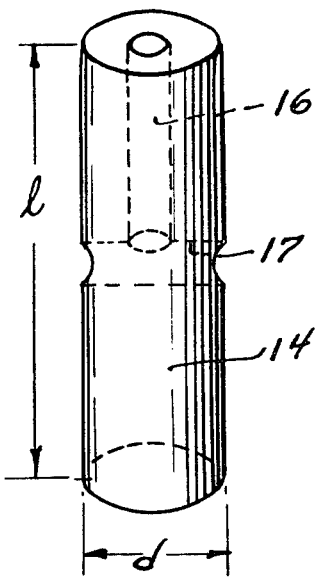

PERMANENT MAGNET PROBE FLOWMETER

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

In order to properly operate many heat-generating devices, it is necessary that the flow of various fluids through the apparatus be measured. This is particularly true in reactors using liquid sodium as the coolant, where the loss of coolant flow can lead to dangerous reactor conditions. In a reactor it is often desirable to use a probe type of flowmeter in measuring the flow of sodium coolant, as the outside of the coolant pipes is not always accessible to exterior-type flowmeters. The probe-type flowmeter is inserted directly into the pipe through which the fluid flows to measure the fluid flow velocity inside the pipe. This type of flowmeter must therefore be capable of withstanding the liquid sodium environment, that is, a very corrosive and very hot environment.

In addition, in order to operate reactors using liquid sodium as a coolant safely, it is necessary that large numbers of flowmeters be used so that any flow failure can be measured quickly and corrective action taken. It is therefore desirable that any flowmeter used be of simple and rugged construction so that large numbers of flowmeters will not be too expensive.

It is therefore an object of this invention to provide an improved type of flowmeter which can be inserted as a probe in a coolant pipe.

Another object of this invention is to provide a flowmeter which is simple and rugged in construction and inexpensive.

Another object of this invention is to provide a flowmeter which can withstand high temperatures and a corrosive environment.

SUMMARY OF THE INVENTION

In practicing this invention, a permanent magnet is enclosed in a tube resistant to the corrosive environment of liquid sodium. The permanent magnet is magnetized so that the lines of flux therefrom are perpendicular to the flow direction of the fluid. A pair of leads are electrically connected to the sodium fluid to measure the voltage developed in the sodium fluid as it flows through the lines of magnetic flux. Metering devices are attached to the pair of leads in order to measure this voltage which is a function of the flow velocity of the conducting fluid. No apparatus is required outside of the tube at the point where the measurement is to be made and the probe does not have to make contact with the tube walls. Thus the flowmeter probe can be inserted and removed from the tube easily.

BRIEF DESCRIPTION OF THE DRAWINGS

The invention is illustrated in the drawings, of which:

FIG. 1 is a cross-sectional view of the flowmeter of this invention shown in position in a pipe;

FIG. 2 is a cross-sectional view of the pipe and flowmeter of FIG. 1;

FIG. 3 is a view of the permanent magnet structure of the flowmeter of FIGS. 1 and 2;

DETAILED DESCRIPTION OF THE INVENTION

Figure 6:
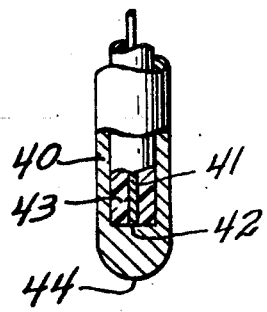
FIG. 6 is a cross-sectional view of the electrodes of FIG. 5 showing the electrode construction.

Referring to FIGS. 1 to 3, there is shown the permanent magnet flowmeter of this invention. A permanent magnet probe flowmeter allows flow velocity measurement of conducting liquids in tubes and uses no apparatus outside the tube near the location of the probe. The flowmeter can be inserted into the tube and removed as desired. The flowmeter has a positioning projection 12 which is inserted in a holder 15 placed in tube 10. The fluid in tube 10 flows in the direction indicated by the flow arrows 11 and is a conducting fluid such as liquid sodium.

The probe housing 13 is made of a nonferromagnetic material such as a stainless steel and encloses the magnet and electrodes of the probe. The probe housing material is of a type which will withstand the temperature and corrosive properties of the fluid in the pipe 10.

A permanent magnet 14 is contained within the probe housing 13 and is magnetized to develop a flux in the tube 10 perpendicular to the direction of flow velocity of the fluid in tube 10, as shown by the magnetic field lines 27 and 28. Permanent magnet 14 contains two holes 16 and 17 which permit the wires connected to the electrodes required to measure the e.m.f. generated in the fluid to be placed in the proper position in the probe 13. Wires 19 and 20 pass through hole 16 and are split with one being electrically connected to the inside of probe 13 at point 24 and the other wire being electrically connected to the inside of probe 13 at point 25 to form the electrodes. The electric potential between points 24 and 25 is measured by voltmeter 22 which is connected to wires 19 and 20. If the permanent magnet is housed within a conducting material such as stainless steel, the electrodes 24, 25 can be connected to the inner surface of the probe. If the probe material is nonconductive, the contacts can protrude through sealed holes or can be positioned outside, as will be described in a subsequent portion of the specification.

The magentic field, as shown by the flux lines 27 and 28 of FIG. 2, is substantially perpendicular to the flow direction of the fluid in pipe 10 and has an axis of symmetry 29. The magnetic fields on opposite sides of the axis of symmetry outside of the permanent magnet are different. In the example of the magnetic field shown in FIG. 2, the field is clockwise on the right side and counterclockwise on the left side of the axis of symmetry. These field directions could be reversed if desired. The electrodes 24 and 25 are positioned on opposite sides of the axis of symmetry 29.

The permanent magnet flowmeter measures the velocity of a fluid by measuring the electrical potential difference developed between two points in a conductive fluid moving in a magnetic field. Thus the potentials outside of the probe 13 at points 24 and 25 are different and the potential difference is measured by voltmeter 22. The magnitude of this potential difference is a function of the flow velocity of the fluid in pipe 10. The maximum sensitivity of the flowmeter is achieved when a line joining the points of contact 24 and 25 is substantially perpendicular to the axis of symmetry 29 and the flow direction; however, the contacts can be located at other positions on opposite sides of the axis of symmetry.

The ends of the permanent magnet 14 produce flux lines which are not perpendicular to the flow direction and thus contribute "noise" to the signal being measured. It has been found that this noise can be minimized to a point where it is not an important factor if the length $l$ of the permanent magnet is at least four times the diameter $d$ of the permanent magnet. The electrodes 24 and 25 are then positioned midway of the length $l$ of the permanent magnet 14.

Figure 4:
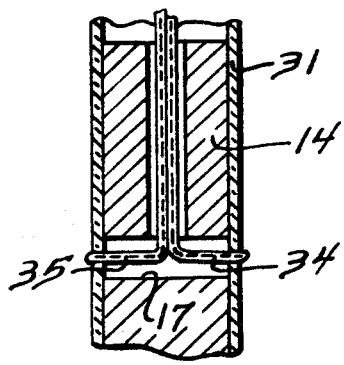
FIG. 4 shows an alternate construction for the electrodes of FIGS. 1 and 2.

Referring to FIG. 4, there is shown a form of the flowmeter probe in which the walls of the housing 31 are formed of a material which is not conductive. In this case, the electrodes 34 and 35 penetrate the housing 31 through sealed holes and make direct contact with the fluid outside of the probe housing. The probe material need only be nonferromagnetic so that the magnetic field penetrates into the fluid.

Figure 5:
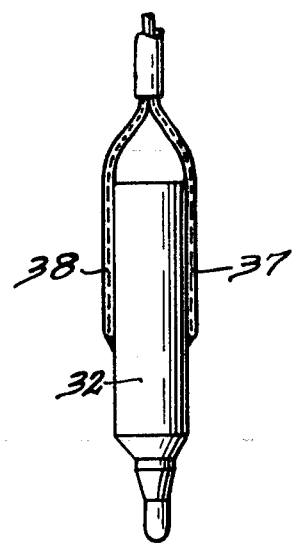
FIG. 5 shows an alternate construction of the flowmeter in which the electrodes are mounted outside of the flowmeter body.

Referring to FIG. 5, there is shown a view of a probe 32 similar in construction to the probe of FIGS. 1 to 3. However, in probe 32 the electrodes 37 and 38 are positioned outside of probe 32 in direct contact with the fluid. With this form of construction the material from which the probe 32 is manufactured need not be conductive but only need be nonferromagnetic so that the flux lines of the permanent magnet contained therein will penetrate into the fluid.

Referring to FIG. 6, there is shown an enlarged view of one of the electrodes 37 and 38 of FIG. 5. The interior wire 41 of the electrode is electrically connected to the conductive sheath 40 at point 42 only. The wire 41 is insulated from all other points of the sheath 40 by insulation 43. The voltage on wire 41 is the potential in the fluid at point 44 on the sheath. The end 44 of sheath 40 is placed at a desired position in the fluid to measure the fluid velocity at this point.

Figure 7:
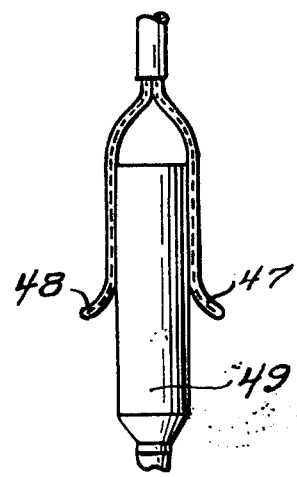
FIG. 7 is an alternate form of the flowmeter of FIG. 5.

Referring to FIG. 7, there is shown an alternate form of the probe similar to that of FIG. 5. In FIG. 7, electrodes 47 and 48 of probe 49 are bent outward away from the body of the probe. The ends of electrodes 47 and 48 are the same as shown in detail in FIG. 6. By placing the ends of the electrodes out away from the probe body, the probe measures the velocity of the fluid through the pipe unaffected by any stagnant boundary layer which may be next to the probe body 49.

The embodiments of the invention in which an exclusive property or privilege is claimed are defined as follows:

1. A permanent magnet flowmeter for measuring the velocity of a conducting fluid, comprising, a probe positioned entirely within the fluid, said probe including a permanent magnet for developing a magnetic field within the fluid with the direction of said magnetic field in said magnet and in said fluid being substantially perpendicular to the flow direction of the fluid, said magnetic field having an axis of symmetry perpendicular to said flow direction with said magnetic field outside of said permanent magnet having a clockwise direction on one side of said axis of symmetry and a counterclockwise direction on the other side of said axis of symmetry, said probe further including a pair of electrodes positioned on opposite sides of said axis of symmetry and in electrical contact with the fluid, and means connected to said pair of electrodes for measuring the potential therebetween.

2. The flowmeter of claim 1 wherein, a line joining said pair of electrodes is substantially perpendicular to said axis of symmetry and said flow direction.

3. The flowmeter of claim 2 wherein, said probe includes a housing of a nonferromagnetic material and having a circular cross section perpendicular to said flow direction, said permanent magnet being positioned within said housing and having a cylindrical shape with the cylinder axis substantially parallel to said flow direction, said permanent magnet being magnetized so that said axis of symmetry is perpendicular to said cylinder axis.

4. The flowmeter of claim 3 wherein, the length of said cylindrical permanent magnet is at least four times the diameter thereof.

5. The flowmeter of claim 4 wherein, said housing is electrically conductive, said electrodes being in contact with the inside of said housing and positioned at substantially the midpoint of the length of said permanent magnet.

6. The flowmeter of claim 3 wherein, said electrodes extend through said housing and are in direct electrical contact with said fluid.

7. The flowmeter of claim 3 wherein, said electrodes are positioned on the outside of said housing, each of said electrodes being enclosed in a protective electrically conductive sheath and being electrically insulated therefrom, each of said electrodes further being electrically connected to said enclosing protective sheath at one point with a line joining the points at which said electrodes are connected to said sheath being substantially perpendicular to said axis of symmetry.

8. The flowmeter of claim 7 wherein, said points of said sheaths at which said electrodes are electrically connected to said sheaths are spaced away from said housing a predetermined amount.

* * * * *